Figure 1:
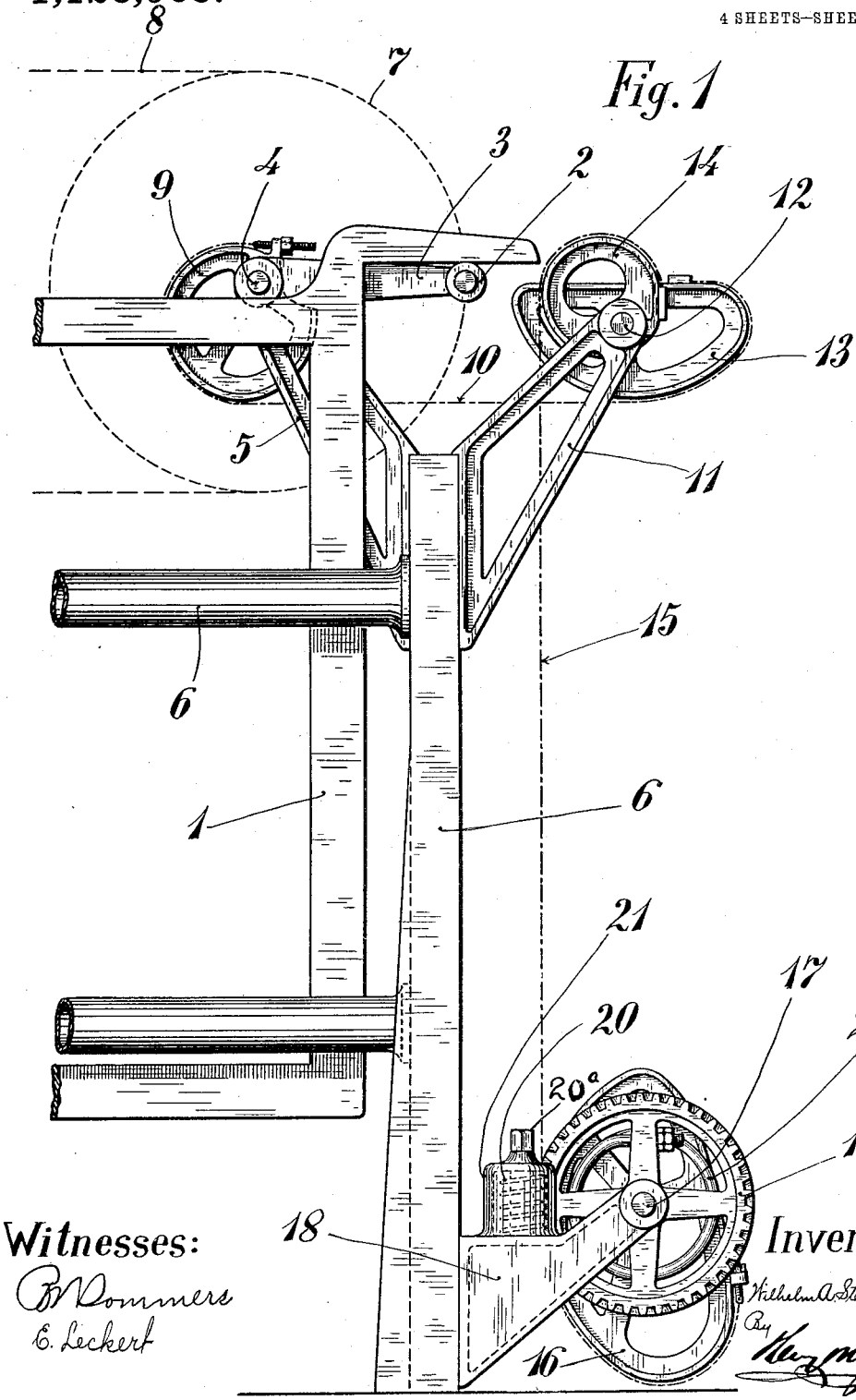

W. A. STELLMACHER.
MECHANISM FOR BALANCING BY YIELDING RESISTANCES WEIGHTS AS EMBROIDERY WORK FRAMES SUSPENDED BY SUPPORTING LEVERS.
APPLICATION FILED MAY 21, 1912.

1,126,905.

Patented Feb. 2, 1915.

4 SHEETS—SHEET 1.

Witnesses:
Inventor:

W. A. STELLMACHER.
MECHANISM FOR BALANCING BY YIELDING RESISTANCES WEIGHTS AS EMBROIDERY WORK FRAMES SUSPENDED BY SUPPORTING LEVERS.
APPLICATION FILED MAY 21, 1912.
1,126,905.
Patented Feb. 2, 1915.
4 SHEETS—SHEET 2.
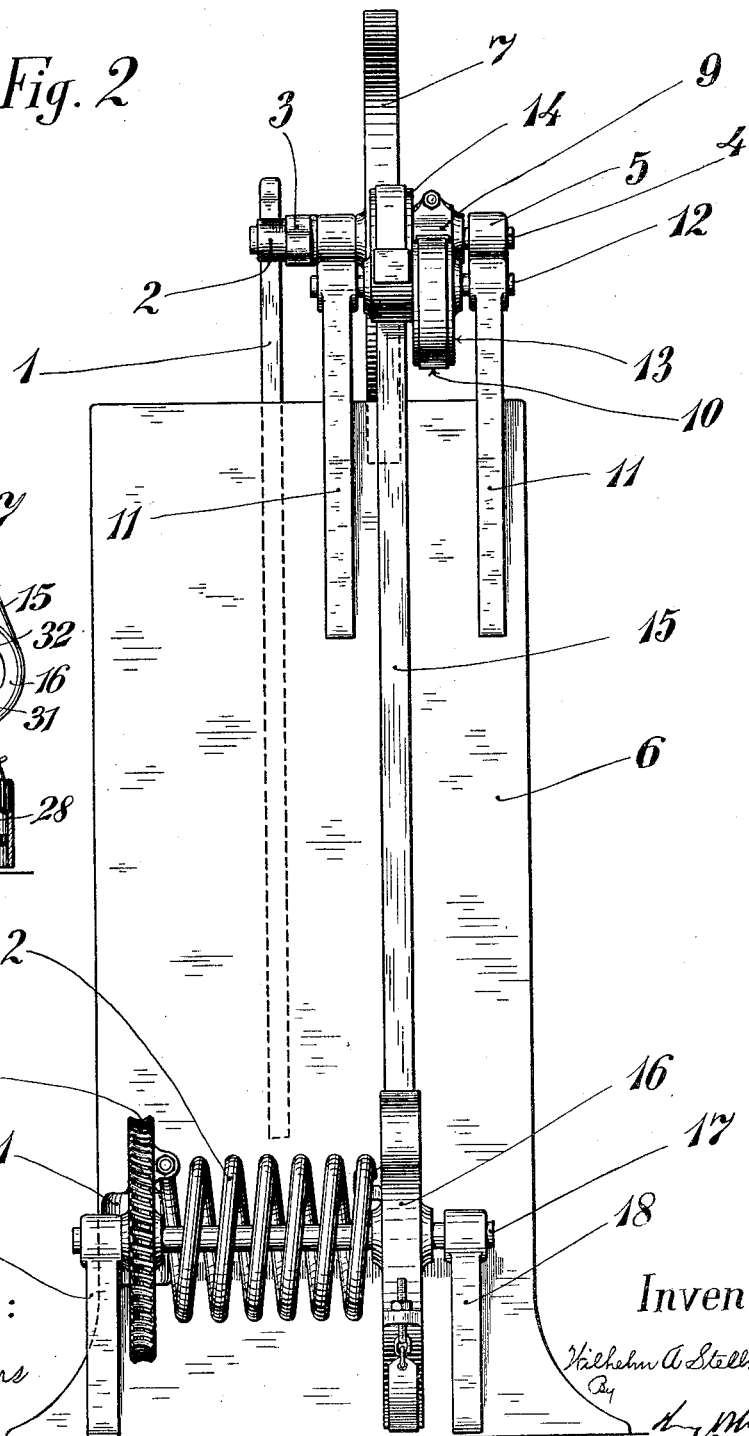
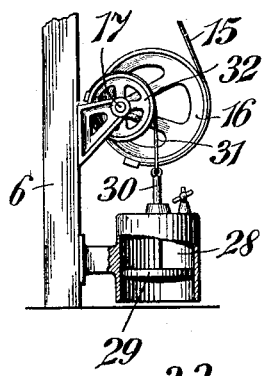
Witnesses:
Inventor:

W. A. STELLMACHER.
MECHANISM FOR BALANCING BY YIELDING RESISTANCES WEIGHTS AS EMBROIDERY WORK
FRAMES SUSPENDED BY SUPPORTING LEVERS.
APPLICATION FILED MAY 21, 1912.

1,126,905.

Patented Feb. 2, 1915.

4 SHEETS—SHEET 3.

Witnesses:
B. Dommers
E. Leckert.

Inventor:
Wilhelm A. Stellmacher
By
Atty

W. A. STELLMACHER.
MECHANISM FOR BALANCING BY YIELDING RESISTANCES WEIGHTS AS EMBROIDERY WORK
FRAMES SUSPENDED BY SUPPORTING LEVERS.
APPLICATION FILED MAY 21, 1912.
1,126,905. Patented Feb. 2, 1915.
4 SHEETS—SHEET 4.
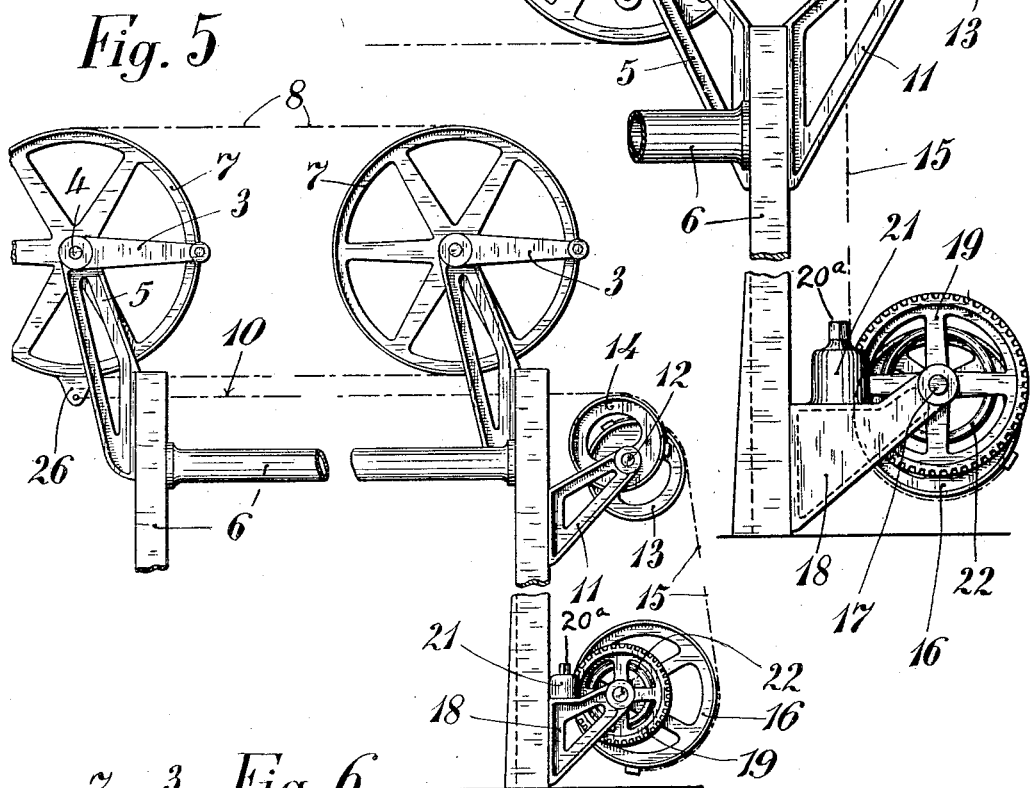

UNITED STATES PATENT OFFICE.

WILHELM ALBERT STELLMACHER, OF ARBON, SWITZERLAND.

MECHANISM FOR BALANCING BY YIELDING RESISTANCES WEIGHTS AS EMBROIDERY-WORK FRAMES SUSPENDED BY SUPPORTING-LEVERS.

1,126,905.

Specification of Letters Patent. Patented Feb. 2, 1915.

Application filed May 21, 1912. Serial No. 698,844.

*To all whom it may concern:*

Be it known that I, WILHELM ALBERT STELLMACHER, a citizen of the Republic of Switzerland, residing at Arbon, Switzerland, have invented new and useful Improvements in Mechanisms for Balancing by Yielding Resistances Weights as Embroidery-Work Frames Suspended by Supporting-Levers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to mechanisms for balancing weights by yielding resistances in which mechanism the action of the resistance is transmitted to the weight by means of curved members which are connected to each other by drawing members. By such mechanisms as hitherto constructed weights can be balanced only, which are suspended by levers which remain constant at all heights of the weight (concentric disks), but it is impossible to balance thereby as much as practically necessary weights which are suspended on levers the effective length of which alters at the different heights of the weight (supporting levers).

The object of my invention is to provide a mechanism of the type referred to, in which compensating members are inserted between the supporting levers and the resistance, the effective leverage of which members alter when the weight or embroidery work frame is vertically moved so that said weight or frame will be balanced in all its positions, *i. e.* under all conditions of operation.

The accompanying drawings illustrate different forms of construction of a mechanism according to my invention in connection with embroidery machines, only those parts of the machines being shown which are necessary for purposes of explanation.

Figure 3:
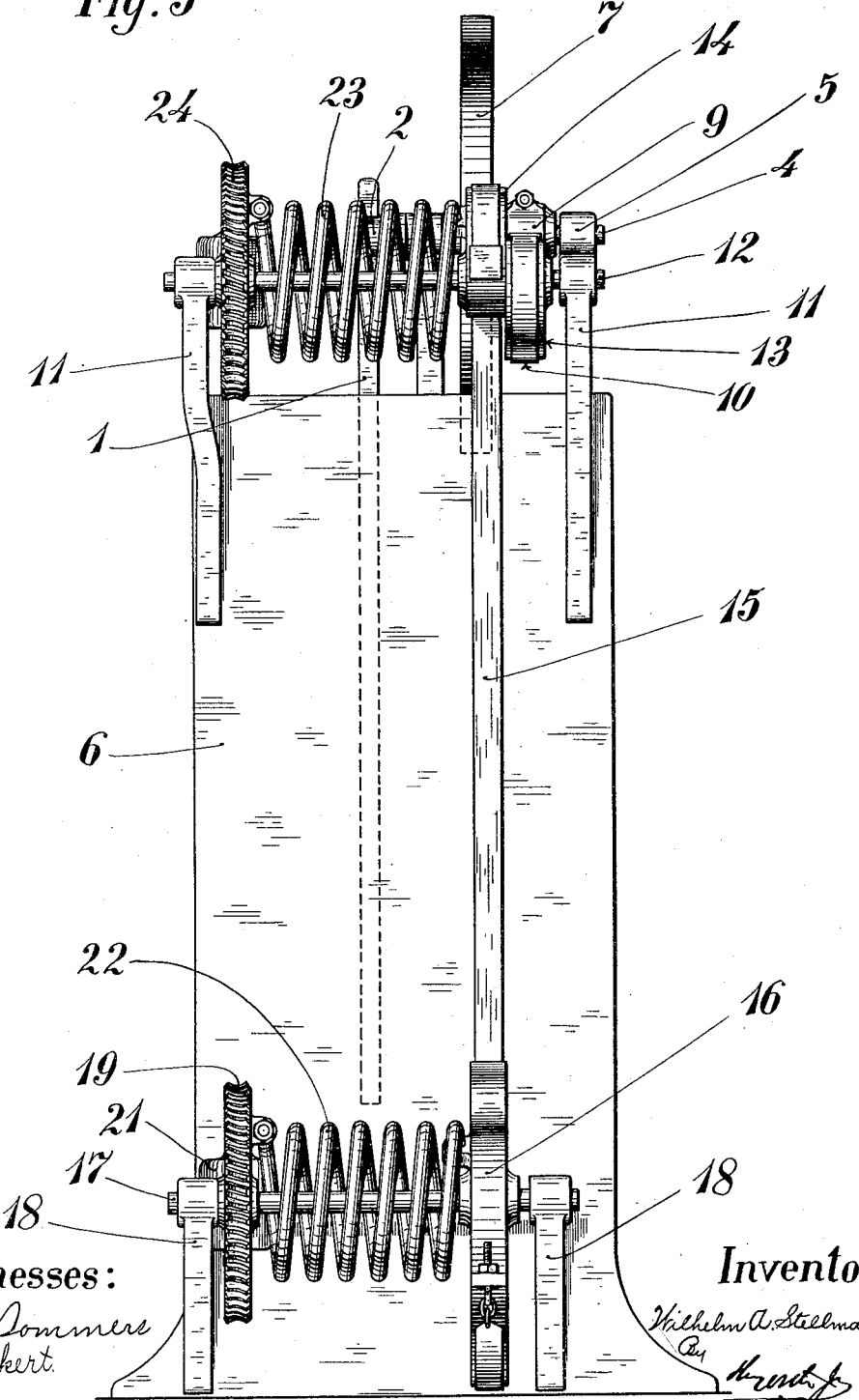

Figure 1 is a side elevation and Fig. 2 a front elevation showing a first form of construction. Fig. 3 is a front elevation showing a second form of construction. Figs. 4 to 6 are side elevations illustrating three other forms of construction. Fig. 7 illustrates the use of another kind of resistance than that used in the remaining forms of construction.

Referring first to Figs. 1 and 2, 1 designates an embroidery work frame which is supported by rollers 2 mounted on levers 3 of which only one is shown on the drawings. The supporting levers 3 are fixed on axles 4 which are mounted to turn in an arm 5 secured to the frame 6 of the embroidery machine. Disks 7 are secured to the axles 4, which disks are connected to each other by an endless drawing member 8. To one of the axles 4 there is also secured a curved disk 9 on the surface of which a drawing member 10 is guided, the latter being adjustably connected at one end to the disk. Arms 11 secured to the frame 6 form a bearing for an axle 12 which carries two curved disks 13 and 14. The drawing member 10 is guided on the surface of the disk 13 and secured to it. A drawing member 15 is guided on the surface of the curved disk 14 and at one end is secured to it while at its other end this drawing member is guided on the surface of a curved disk 16 to which it is adjustably connected. The disk 16 is secured to an axle 17 which is supported by arms 18 secured to the frame 6. A worm wheel 19 loosely mounted on the axle 17 engages a worm 20 arranged within a casing 21 on one of the arms 18. A helical torsion spring 22 is secured at one end to the curved disk 16 and at its other end to the worm wheel 19.

The spring 22 balances the weight of the work frame 1 and is stretched more or less according to the different vertical positions of the work frame. The tension of the spring may be adjusted by means of the worm wheel 19, worm 20 and a key set on a square 20$^a$ forming an extension of the worm shaft projecting from the casing 21. The work frame 1 being suspended by supporting levers, the action of its weight on the spring 22 varies at the different heights of the frame. The curved disks therefore must balance the action of the weight of the frame at its different heights, as well as compensate the variations of the strength of the spring for said heights, while with the constructions in which concentric disks are applied it is necessary only to balance the weight itself.

The surfaces of the curved disks 9, 13, 14 and 16 are shaped so that when the height of the work frame 1 is altered, always the effective leverage of one disk of each pair of disks 9, 13, and 14, 16 is altered, that means substantially increased while the acting levers of the other disks are accordingly substantially decreased in such manner that the torsional movement of the spring is retarded so much with relation to the rotation of the supporting levers, that the tension of the spring is altered only a small amount, even if the alteration of the leverage of the supporting levers is wholly balanced.

The alteration of the leverage of the supporting levers could not be balanced without inserting the two curved disks 13 and 14, otherwise such forms of the two remaining curves 9, 16 would become necessary that practically could not be used.

In the form of construction shown in Fig. 3 there is arranged a second spring 23 by the side of the curved disks 13 and 14. One end of this spring is secured to the curved disk 14 while the other end is secured to the worm wheel 24 of a worm adjusting mechanism, by means of which the tension of the spring 23 may be adjusted in the above described manner. In this construction both springs 22, 23 act to support the work frame 1 while they are connected to curved disks which perform different angles of rotation. The balancing between the weight of the frame and the springs is performed by the sum of the actions of all curves.

In the form of construction shown in Fig. 4 the curved disk 9 is replaced by a lever 25. The curved disk 16 is formed with regard to the alteration of the action of lever 25 at the different heights of the frame 1 so that the frame and the spring are balanced at all positions of the frame.

The same result is obtained with the form of construction shown in Fig. 5 in which the drawing member 10 is secured at one end to a projection 26 of one of the disks 7. Also in the form of construction according to Fig. 6 the drawing member 10 is secured at one end to a projection 26 of one of the disks 7. The curved disk 13 is replaced by a lever 27 and the curved disk 16 is formed according to the alterations of the action of lever 27 and of the lever arm of the point on which the drawing member 10 is secured to the projection 26.

The torsion springs 22, 23 may be arranged on both sides of the curved disks if desired. The springs may also be replaced by other kinds of yielding resistances as for example a pneumatic cushion (Fig. 7). In this form of construction a piston 29 is mounted in a cylinder 28 secured to the frame 6, the piston rod 30 being connected to a drawing member 31. The latter is guided and fixed on the surface of a concentric disk 32 secured to the axle 17. The space in the cylinder above the piston 29 is filled with compressed air which forms a resistance and balances the weight of the embroidery work frame.

I claim:

1. Mechanism for spring balancing lever supported weights, which comprises the combination with a weight-supporting lever; of means connected to said lever for compensating the variation of the effective leverage of said lever during its movement, spring-balancing means for balancing the weight, and mechanism for automatically compensating the variation in strength of the spring for different positions of the weight counterbalanced thereby, whereby the power required to move the weight is the same under all conditions of operation.

2. Mechanism for spring balancing lever-supported weights, which comprises the combination with a weight-supporting lever; of means for compensating the variations of the effective leverage of said member, a connecting member between said lever and means, a counterbalancing spring, means for automatically compensating for the variation in strength of the spring for different positions of the weight and connecting means between the two compensating means.

3. Mechanism for spring balancing lever-supported weights which comprises the combination with a weight-supporting lever; of cam mechanism for compensating the variation of the effective leverage of said lever, a counterbalancing spring, cam mechanism connected to said spring for compensating the variation in strength of the spring, and a connecting member between the cam mechanisms.

4. In mechanism for spring balancing lever-supported weights, the combination with a weight-supporting lever; of means for compensating the variation of the effective leverage of said lever, a counterbalancing spring, means for adjusting the strength of the spring, a cam for compensating the variation in the length of the spring for varying positions of the weight, and a flexible tensile connection between the two compensating mechanisms.

5. In mechanism for spring balancing lever-supported weights; the combination with a weight supporting lever, of means for compensating for the variation of the effective leverage of said lever, an adjustable, flexible connecting member between said arm and means, a torsion spring, means to compensate for the varying strength of the spring a flexible, adjustable connecting member between said two means, and means to adjust the tension of said spring.

6. In mechanism for spring balancing lever-supported weights, the combination with a weight-supporting lever; of a pair of cams for compensating for the variation of the effective leverage of said lever, a flexible connection between one of the cams and said lever arm, a torsion spring, a cam connected thereto for compensating variations in spring tension, a flexible connection between the second one of said pair of cams and the cam connected to said spring, a worm wheel connected to the spring, and a worm for rotating the wheel, whereby the tension of said spring may be altered.

In testimony that I claim the foregoing as my invention, I have signed my name in presence of two subscribing witnesses.

WILHELM ALBERT STELLMACHER.

Witnesses:
FRIDOLIN OSTWALDER.
EUGENE NABEL.

Copies of this patent may be obtained for five cents each, by addressing the "Commissioner of Patents, Washington, D. C."